United States Patent
Zhang et al.

(10) Patent No.: US 11,050,657 B2
(45) Date of Patent: Jun. 29, 2021

(54) METHOD, DEVICE AND NODE FOR MESSAGE TRANSMISSION, AND COMPUTER STORAGE MEDIUM

(71) Applicant: XI'AN ZHONGXING NEW SOFTWARE CO., LTD., Shaanxi (CN)

(72) Inventors: Zheng Zhang, Shenzhen (CN); Cui Wang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/342,757

(22) PCT Filed: Oct. 18, 2017

(86) PCT No.: PCT/CN2017/106660
§ 371 (c)(1),
(2) Date: Apr. 17, 2019

(87) PCT Pub. No.: WO2018/072704
PCT Pub. Date: Apr. 26, 2018

(65) Prior Publication Data
US 2020/0053000 A1 Feb. 13, 2020

(30) Foreign Application Priority Data
Oct. 20, 2016 (CN) .......................... 201610915563.2

(51) Int. Cl.
*H04L 12/723* (2013.01)
*H04L 12/24* (2006.01)
(Continued)

(52) U.S. Cl.
CPC .............. *H04L 45/16* (2013.01); *H04L 45/12* (2013.01); *H04L 45/50* (2013.01)

(58) Field of Classification Search
CPC ......... H04L 45/16; H04L 45/74; H04L 12/18; H04L 45/54; H04L 45/745; H04L 12/185;
(Continued)

(56) References Cited

U.S. PATENT DOCUMENTS 9,853,822 B2 * 12/2017 Wijnands ................ H04L 45/16
10,003,494 B2 * 6/2018 Wijnands ................ H04L 45/28
(Continued)

FOREIGN PATENT DOCUMENTS

CN    105556899 A    5/2016
CN    105743793 A    7/2016

OTHER PUBLICATIONS

International Search Report for corresponding application PCT/CN2017/106660 filed Oct. 18, 2017; dated Dec. 6, 2017.
(Continued)

*Primary Examiner* — Sai Aung
(74) *Attorney, Agent, or Firm* — Cantor Colburn LLP (57) ABSTRACT

A method, device and node for message transmission, and a computer storage medium are provided, the method including Bit Indexed Explicit Replication (BIER) information which is sent by other nodes except a first node in a distance-vector routing protocol (Babel) network in a Babel protocol extension manner is received, wherein the BIER information is used for acquiring a BIER forwarding entry; the BIER forwarding entry is acquired according to the BIER information; and a message encapsulated in a BIER manner is sent to said other nodes according to the BIER forwarding entry.

13 Claims, 7 Drawing Sheets

(51) Int. Cl.
*H04L 12/761* (2013.01)
*H04L 12/721* (2013.01)

(58) Field of Classification Search
CPC . H04L 12/1886; H04L 41/0668; H04L 45/02; H04L 45/12; H04L 45/28; H04L 45/50
See application file for complete search history.

(56) References Cited

U.S. PATENT DOCUMENTS

| | | | | |
|---|---|---|---|---|
| 10,033,632 | B2* | 7/2018 | Wijnands | H04L 45/50 |
| 10,284,457 | B2* | 5/2019 | Muthukaruppan | H04L 45/745 |
| 10,439,928 | B2* | 10/2019 | Przygienda | H04L 45/24 |
| 10,461,946 | B2* | 10/2019 | Wijnands | H04L 45/74 |
| 10,581,624 | B2* | 3/2020 | Dutta | H04L 45/745 |
| 2002/0126661 | A1* | 9/2002 | Ngai | H04L 12/42 370/380 |
| 2015/0181309 | A1 | 6/2015 | Shepherd et al. | |
| 2016/0127139 | A1 | 5/2016 | Tian et al. | |
| 2016/0301628 | A1 | 10/2016 | Wijnands et al. | |
| 2016/0308755 | A1* | 10/2016 | Garg | H04L 47/122 |
| 2017/0034041 | A1* | 2/2017 | Carofiglio | H04L 45/122 |

OTHER PUBLICATIONS

EP Extended Search Report dated Jul. 16, 2019 re: Application No. PCT/CN2017/106660, pp. 1-6, citing: US 2016/301628 A1, US 2015/181309 A1, US 2016/127139 A1, Xu et al, "BIER encapsulation".

X. Xu et al. "BIER Encapsulation", Feb. 24, 2015, Network Working Group, pp. 1-6, Retrieved from the Internet: URL:https://www.ietf.org/archive/id/draft-xu-bier-encapsulation-02.txt [retrieved on Feb. 26, 2019].

X. Xu et al. "BIER Encapsulation", Feb. 24, 2015, Network Working Group, pp. 1-6, Retrieved from the Internet: URL: https://www.ietf.org/archive/id/draft-xu-bier-encapsulation-02.txt [retrieved on Feb. 26, 2019] English Abstract.

* cited by examiner

| Type | Length |
|---|---|
| Sub-domain-id ||

Fig. 7

| Type | Length |
|---|---|
| Sub-domain-id ||
| BFR-Prefix ||
| BFR-id ||

| Type=6 | Length |
|---|---|
| BSL=64 ||

Fig. 10

| Type=7 | Length |
|---|---|
| BSL=64/128 ||

Fig. 11

| Type=8 | Length |
|---|---|
| MPLS ||

Fig. 12

| Type=9 | Length |
|---|---|
| Label ||
| Sub-domain ||
| SI ||
| BSL ||

METHOD, DEVICE AND NODE FOR MESSAGE TRANSMISSION, AND COMPUTER STORAGE MEDIUM

TECHNICAL FIELD

The present disclosure relates to the communication field, and in particular to a method, device, and node for message transmission, and a computer storage medium.

BACKGROUND

Multicast technologies play an increasingly significant role in the Internet today. Interactive Personality TV (IPTV), Net-Meeting, and live action use the multicast technologies. The existing multicast technologies include Protocol Independent Multicast (PIM), Internet Control Message Protocol (IGMP), Multicast Listener Discovery Protocol (MLD), and so on. In an initial small-scale application scenario, these existing protocols may satisfy users' requirements. However, with the increasingly wide-scale application of multicast technologies, the networking form becomes more and more complex. When the multicast is directly applied in the Internet, a large number of control resources and signaling interactions of intermediate nodes are often occupied due to too many multicast states in a backbone network, and the development of Virtual Private Network (VPN) technology which is widely applied at present cannot be well supported. Therefore, the development direction at present tends to complete the transmission of multicast traffic by means of other technologies instead of running the traditional multicast protocol in the backbone network. Related technologies which may solve these problems include a Multicast Label Distribution Protocol (MLDP) technology, a Point-to-Multi Point Traffic Engineering (P2MPTE) technology, a Bit Indexed Explicit Replication (BIER) technology, and so on.

The core of the BIER technology is representing each node of a network edge by only one bit, the multicast traffic is transmitted in an intermediate network, and an extra specific BIER header is encapsulated, herein this message header indicates all destination nodes of the multicast traffic in the form of a bit string. An intermediate network forwarding device routes according to the bits, so as to ensure that the traffic can be sent to all the destination nodes. The intermediate node forwarding device forwards node information in advance through internal protocols like an Open Shortest Path First (OSPF) protocol and an Intermediate System to Intermediate System (ISIS) protocol in the layer-3 network, forms a Bit Index Forwarding Table (BIFT) used for guiding BIER forwarding, and completes the forwarding to the destination nodes of the message according to the BIFT when receiving the traffic encapsulated with a BIER header.

A distance-vector routing protocol (Babel) is a routing protocol using a distance-vector routing algorithm and supporting IPv6 and IPv4, has merits such as good stability and high efficiency, and may be applied to wired and wireless networks. Compared with a wired network protocol represented by RIP, the Babel no longer uses a hop count to select an optimal route, but uses an Expected Transmission Count (ETC) to calculate the hop count reaching a certain node. The ETC not only considers information about the hop count reaching a certain node, but considers a series of indexes like link bandwidth and degree of congestion as the basis of route selection. However, the ETC will keep changing due to the change of wireless environments and the joining and exit of network nodes, which causes the route to keep turning, thereby making the network difficult to converge. Therefore, the Babel uses a history-sensitive mechanism to accelerate the convergence of the network, that is, a used path is selected in the case of approximate ETC values. The Babel will not perform periodical route update and declaration over the entire network after the convergence of the network, and triggers the update passively only when node information and state changes.

Thus, the BIER technology, as a multicast technology with advanced significance, may provide multicast traffic forwarding based on the shortest path, and eliminates a multicast entry state that the intermediate node needs to save in the multicast technology. However, in the related art, relevant information about the BIER technology cannot be transmitted in a network running the Babel routing protocol.

SUMMARY

The embodiments of the present disclosure provide a method, device and node for message transmission, which may at least solve a problem in the related art that relevant information about BIER technology cannot be transmitted in a network running a Babel routing protocol.

According to an embodiment of the present disclosure, a method for message transmission is provided. The method includes: BIER information which is sent by other nodes except a first node in a distance-vector routing protocol (Babel) network in a Babel protocol extension manner is received, herein the BIER information is used for acquiring a BIER forwarding entry; the BIER forwarding entry is acquired according to the BIER information; and a message encapsulated in a BIER manner is sent to said other nodes according to the BIER forwarding entry.

According to an exemplary embodiment, the BIER information includes at least one of Bit Forwarding Router Identifier (BFR-id) information of a node and BFR-Prefix information of the node.

According to an exemplary embodiment, the BIER information further includes one or more of: a Sub-domain Identifier (Sub-domain-id), a Set Identifier (SI), a Bit String Length (BSL), a Topology Identifier (Topology-id), an encapsulation manner, algorithm information, a Multiprotocol Label Switching (MPLS) label, and tunnel encapsulation information.

According to an exemplary embodiment, the BIER forwarding entry is acquired according to the BIER information may further include: the BIER forwarding entry is acquired according to the BIER information and either of a default distance-vector routing algorithm and a Shortest Path First (SPF) algorithm.

According to an exemplary embodiment, after the BIER information which is sent by said other nodes except the first node in the Babel network in the Babel protocol extension manner is received, the method further includes: the BIER information and BIER information of the first node are sent to said other nodes except the first node in the Babel network in the Babel protocol extension manner.

According to an exemplary embodiment, the BIER information is sent to said other nodes except the first node in the Babel network in the Babel protocol extension manner may further include: the BIER information is sent to all other interfaces except an interface receiving the BIER information in said other nodes in the Babel protocol extension manner, or according to a Babel route calculation result, the BIER information is sent to other interfaces except an interface having a shortest path to the first node in said other nodes.

According to an exemplary embodiment, the Babel protocol extension manner may include at least one of a Type Length Value (TLV) manner and a sub-TLV manner.

According to an exemplary embodiment, the message encapsulated in the BIER manner includes: a message encapsulated by a BIER header, or a message encapsulated in an MPLS+BIER manner.

According to another embodiment of the present disclosure, a device for message transmission is provided, which includes: a receiving module, an acquiring module, and a sending module. The receiving module is configured to receive BIER information which is sent by other nodes except a first node in a distance-vector routing protocol (Babel) network in a Babel protocol extension manner, herein the BIER information is used for acquiring a BIER forwarding entry. The acquiring module is configured to acquire the BIER forwarding entry according to the BIER information. The sending module is configured to send a message encapsulated in a BIER manner to said other nodes according to the BIER forwarding entry.

According to an exemplary embodiment, the BIER information includes at least one of BFR-id information of a node and BFR-Prefix information of the node.

According to an exemplary embodiment, the BIER information further includes one or more of: a Sub-domain-id, an SI, a BSL, a Topology-id, an encapsulation manner, algorithm information, an MPLS label, and tunnel encapsulation information.

According to an exemplary embodiment, the acquiring module is further configured to acquire the BIER forwarding entry according to the BIER information and either of a default distance-vector routing algorithm and an SPF algorithm.

According to an exemplary embodiment, the sending module is further configured to, after receiving the BIER information which is sent by said other nodes except the first node in the Babel network in the Babel protocol extension manner, send the BIER information and BIER information of the first node to said other nodes except the first node in the Babel network in the Babel protocol extension manner.

According to an exemplary embodiment, the sending module is further configured to send the BIER information to all other interfaces except an interface receiving the BIER information in said other nodes in the Babel protocol extension manner, or according to a Babel route calculation result, send the BIER information to other interfaces except an interface having a shortest path to the first node in said other nodes.

According to an exemplary embodiment, the Babel protocol extension manner may include at least one of a TLV manner and a sub-TLV manner.

According to an exemplary embodiment, the message encapsulated in the BIER manner includes: a message encapsulated by a BIER header, or a message encapsulated in a MPLS+BIER manner.

According to another embodiment of the present disclosure, a node is provided. The node includes: a receiving device, which is configured to receive the BIER information which is sent by other nodes except the node in a distance-vector routing protocol (Babel) network in a Babel protocol extension manner, herein the BIER information is used for acquiring a BIER forwarding entry; a processor, which is configured to acquire the BIER forwarding entry according to the BIER information; and a sending device, which is configured to send a message encapsulated in a BIER manner to said other nodes according to the BIER forwarding entry.

According to an exemplary embodiment, the BIER information includes at least one of BFR-id information of a node and BFR-Prefix information of the node.

According to an exemplary embodiment, the BIER information further includes one or more of: a Sub-domain-id, an SI, a BSL, a Topology-id, an encapsulation manner, algorithm information, an MPLS label, and tunnel encapsulation information.

According to an exemplary embodiment, the processor is further configured to acquire the BIER forwarding entry according to the BIER information and either of a default distance-vector routing algorithm and an SPF algorithm.

According to an exemplary embodiment, the sending device is further configured to send the BIER information and BIER information of the node to said other nodes except the node in the Babel network in the Babel protocol extension manner.

According to an exemplary embodiment, the sending device is further configured to send the BIER information to all other interfaces except an interface receiving the BIER information in said other nodes in the Babel protocol extension manner, or according to a Babel route calculation result, send the BIER information to other interfaces except an interface having a shortest path to the node in said other nodes.

According to an exemplary embodiment, the Babel protocol extension manner may include at least one of a TLV manner and a sub-TLV manner.

According to an exemplary embodiment, the message encapsulated in the BIER manner includes: a message encapsulated by a BIER header, or a message encapsulated in a MPLS+BIER manner.

According to yet another embodiment of the present disclosure, a storage medium is also provided. The storage medium is configured to store program codes for performing the following operations: BIER information which is sent by other nodes except a first node in a distance-vector routing protocol (Babel) network in a Babel protocol extension manner is received, herein the BIER information is used for acquiring a BIER forwarding entry; the BIER forwarding entry is acquired according to the BIER information; and a message encapsulated in a BIER manner is sent to said other nodes according to the BIER forwarding entry.

According to an exemplary embodiment, the storage medium is further configured to store program codes for performing the following operation: the BIER information includes at least one of BFR-id information of a node and BFR-Prefix information of the node.

According to an exemplary embodiment, the storage medium is further configured to store program codes for performing the following operation: the BIER information further includes one or more of: a Sub-domain-id, an SI, a BSL, a Topology-id, an encapsulation manner, algorithm information, an MPLS label, and tunnel encapsulation information.

According to an exemplary embodiment, the storage medium is further configured to store program codes for performing the following operation: the BIER forwarding entry is acquired according to the BIER information may further include: the BIER forwarding entry is acquired according to the BIER information and either of a default distance-vector routing algorithm and an SPF algorithm.

According to an exemplary embodiment, the storage medium is further configured to store program codes for performing the following operation: after the BIER information which is sent by said other nodes except the first node in the Babel network in a Babel protocol extension manner is received, the BIER information and BIER information of the first node are sent to said other nodes except the first node in the Babel network in the Babel protocol extension manner.

According to an exemplary embodiment, the storage medium is further configured to store program codes for performing the following operations: the BIER information is sent to said other nodes except the first node in the Babel network in the Babel protocol extension manner may further include: the BIER information is sent to all other interfaces except an interface receiving the BIER information in said other nodes in the Babel protocol extension manner, or according to a Babel route calculation result, the BIER information is sent to other interfaces except an interface having a shortest path to the first node in said other nodes.

According to an exemplary embodiment, the storage medium is further configured to store program codes for performing the following operation: the Babel protocol extension manner may include at least one of a TLV manner and a sub-TLV manner.

According to an exemplary embodiment, the storage medium is further configured to store program codes for performing the following operation: the message encapsulated in the BIER manner includes: a message encapsulated by a BIER header, or a message encapsulated in a MPLS+BIER manner.

In the embodiments of the present disclosure, BIER information which is sent by other nodes except a first node in a distance-vector routing protocol (Babel) network in a Babel protocol extension manner is received, herein the BIER information is used for acquiring a BIER forwarding entry; the BIER forwarding entry is acquired according to the BIER information; and the message encapsulated in the BIER manner is sent to said other nodes according to the BIER forwarding entry. Because the BIER related information may be transmitted in the network in the Babel protocol extension manner, the node may calculate the BIER forwarding entry according to the BIER related information, and traffic encapsulation and forwarding of the BIER may be implemented, so that the BIER technology may be applied in the network running the Babel protocol. Therefore, the technical solution provided in the embodiments of the present disclosure may solve the problem in the related art that relevant information about BIER technology cannot be transmitted in the network running the Babel routing protocol, thereby having a very important promotion effect on the development of multicast technology and network.

BRIEF DESCRIPTION OF THE DRAWINGS

The accompanying drawings described here are used for providing deeper understanding of the present disclosure, and constitute a part of the present application. Schematic embodiments of the present disclosure and description thereof are used for illustrating the present disclosure and not intended to form an improper limit to the present disclosure. In the accompanying drawings.

DETAILED DESCRIPTION OF THE EMBODIMENTS

The present disclosure is elaborated below with reference to the accompanying drawings and embodiments. It is to be noted that the embodiments in the present application and the characteristics in the embodiments may be combined under the condition of no conflicts.

It is to be noted that the terms like "first" and "second" in the specification, the claims and the accompanying drawings of the present disclosure are used for differentiating the similar objects, but do not have to describe a specific order or a sequence.

First Embodiment

Figure 1:
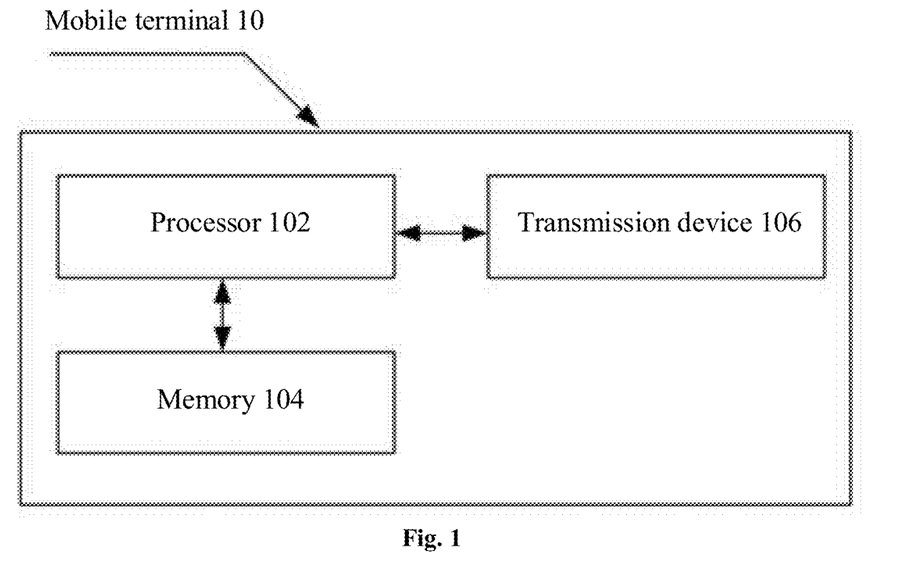
FIG. 1 is a hardware structure diagram of a mobile terminal for a method for message transmission according to an embodiment of the present disclosure.

The method provided by the first embodiment may be performed in a mobile terminal, a computer terminal or similar operating devices. By taking that the method is performed on the mobile terminal, FIG. 1 is a hardware structure diagram of a mobile terminal for a method for message transmission according to an embodiment of the present disclosure. As shown in FIG. 1, the mobile terminal 10 may include one or more (only one is shown here) of a processor 102 (the processor 102 may include, but not limited to, a Micro Processor Unit (MCU) or a Field Programmable Gate Array (FPGA), and other processing devices), a memory 104 for storing data, and a transmission device 106 for a communication function. Those of ordinary skill in the art may understand that the structure shown in FIG. 1 is only schematic, and does not form a limit to the structure of the above electronic device. For example, the mobile terminal 10 may also include more or less components than that in FIG. 1, or has a configuration different from that in FIG. 1.

The memory 104 may be configured to store a software program and module of application software, for example, a program instruction/module corresponding to the method for message transmission in the embodiments of the present disclosure. The processor 102 executes various function applications and data processing by running the software program and module stored in the memory 104, namely implementing the above method. The memory 104 may include a high-speed RAM, and may also include a non-volatile memory, for example, one or more than one magnetic storage device, a flash memory, or other nonvolatile solid state memory. In some examples, the memories 104 may further include memories remotely set relative to the processor 102, and these remote memories may be coupled to the mobile terminal 10 through the network. The examples of the network include, but not limited to, Internet, Intranet, LAN, mobile communication networks and a combination of them.

The transmission device 106 is configured to receive or send data via a network. A specific example of the network may include a wireless network provided by a communication provider of the mobile terminal 10. In an example, the transmission device 106 includes a Network Interface Controller (NIC), which may be connected with other network devices through a base station to communicate with the Internet. In an example, the transmission device 106 may be a Radio Frequency (RF) module, which is configured to communicate with the Internet wirelessly.

Figure 2:
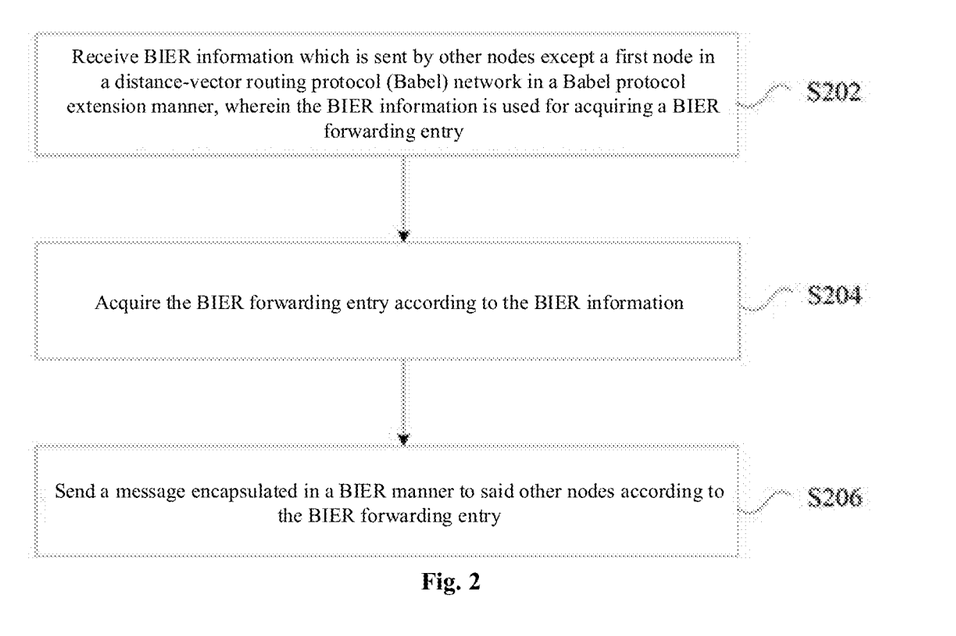
FIG. 2 is a flowchart of a method for message transmission according to an embodiment of the present disclosure.

In the present embodiment, a method for message transmission performed on the mobile terminal is provided. FIG. 2 is a flowchart of a method for message transmission according to an embodiment of the present disclosure. As shown in FIG. 2, the flow includes the following operations.

At S202, BIER information which is sent by other nodes except a first node in a distance-vector routing protocol (Babel) network in a Babel protocol extension manner is received, herein the BIER information is used for acquiring a BIER forwarding entry.

At S204, the BIER forwarding entry is acquired according to the BIER information.

At S206, a message encapsulated in a BIER manner is sent to said other nodes according to the BIER forwarding entry.

Through the above operations, because the BIER related information may be transmitted in the network in the Babel protocol extension manner, the node may calculate the BIER forwarding entry according to the BIER related information, and traffic encapsulation and forwarding of the BIER may be implemented, so that the BIER technology may be applied in the network running the Babel protocol. Therefore, a problem in the related art that relevant information about BIER technology cannot be transmitted in a network running a Babel routing protocol may be solved, thereby having a very important promotion effect on the development of multicast technology and network.

According to an exemplary embodiment, the BIER information includes at least one of BFR-id information of a node and BFR-Prefix information of the node.

According to an exemplary embodiment, the BIER information may also include one or more of: a Sub-domain-id, an SI, a BSL, a Topology-id, an encapsulation manner, algorithm information, an MPLS label, and tunnel encapsulation information.

For example, the BIER information includes: the BFR-id information of the node, the BFR-Prefix information of the node, and/or other BIER related information. The other BIER related information includes one or more of the Sub-domain-id, the SL, the BSL, the Topology-id, the encapsulation manner, algorithm, the MPLS label, and the tunnel encapsulation.

According to an exemplary embodiment, the BIER forwarding entry is acquired according to the BIER information may further include: the BIER forwarding entry is acquired according to the BIER information and either of a default distance-vector routing algorithm and an SPF algorithm. Alternatively, the BIER forwarding entry may also be acquired according to the BIER information and other algorithms carried in the algorithm information.

According to an exemplary embodiment, after the BIER information which is sent by said other nodes except the first node in the Babel network in the Babel protocol extension manner is received, the method further includes: the BIER information and BIER information of the first node are sent to said other nodes except the first node in the Babel network in the Babel protocol extension manner.

According to an exemplary embodiment, the BIER information is sent to said other nodes except the first node in the Babel network in the Babel protocol extension manner may further include: the BIER information is sent to all other interfaces except an interface receiving the BIER information in said other nodes in the Babel protocol extension manner, or according to a Babel route calculation result, the BIER information is sent to other interfaces except an interface having a shortest path to the first node in said other nodes.

According to an exemplary embodiment, the Babel protocol extension manner may include at least one of a TLV manner and a sub-TLV manner. For example, the Babel protocol extension manner may be the TLV manner or the sub-TLV manner, and may also be a combination of several manners.

According to an exemplary embodiment, the message encapsulated in the BIER manner includes: a message encapsulated by a BIER header, or a message encapsulated in an MPLS+BIER manner.

Figure 3:
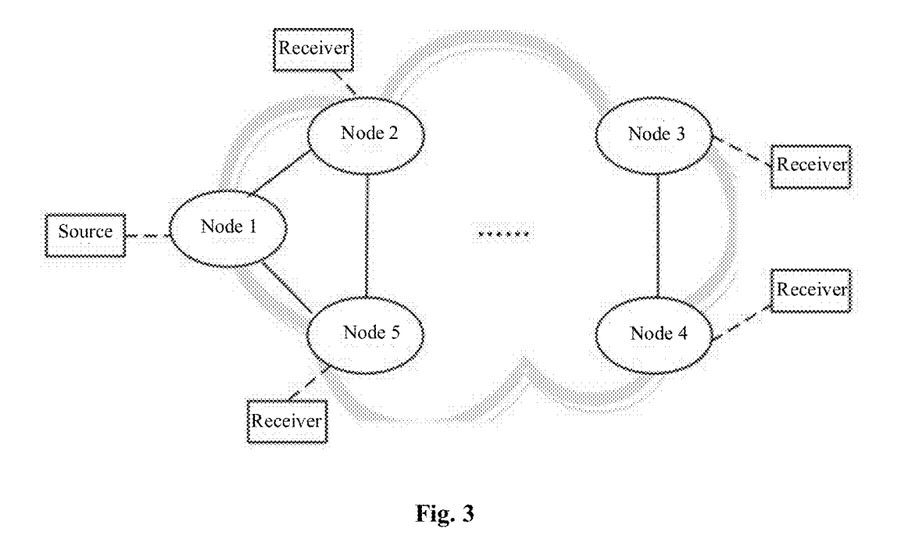
FIG. 3 is a first schematic diagram of a Babel protocol based network according to an embodiment of the present disclosure.

FIG. 3 is a first schematic diagram of a Babel protocol based network according to an embodiment of the present disclosure. In order to facilitate understanding the above embodiment, an elaboration is given by taking the network shown in FIG. 3 for example.

As shown in FIG. 3, the network is a network using the Babel protocol as the routing protocol, and has a BIER function. In order to implement a BIER forwarding function, the BIER related information needs to be spread to each node through the Babel protocol. If the nodes 1/2/3/4/5 are edge nodes of a connection source or a receiver network, for the purpose of simplicity, the number identifies following the nodes in FIG. 3 represent the allocated BFR-id information. For example, the allocated BFR-id information of the node 1 is 1, and the allocated BFR-id information of the node 2 is 2.

Figure 4:
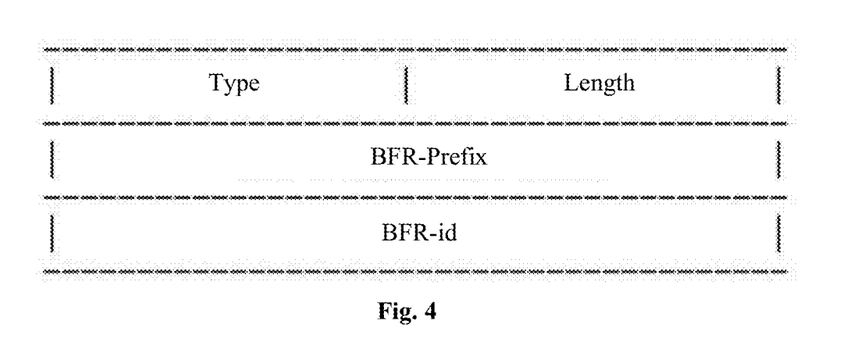
FIG. 4 is a first schematic diagram of notification of BIER related information according to an embodiment of the present disclosure.

The manners of notifying the BIER related information in the Babel protocol may be the TLV manner or the sub-TLV manner. The specific content of the BIER related information may be notified in a manner shown in FIG. 4, here a type value is assumed as 1, and the BFR-id and the BFR-Prefix information are also notified.

Figure 5:
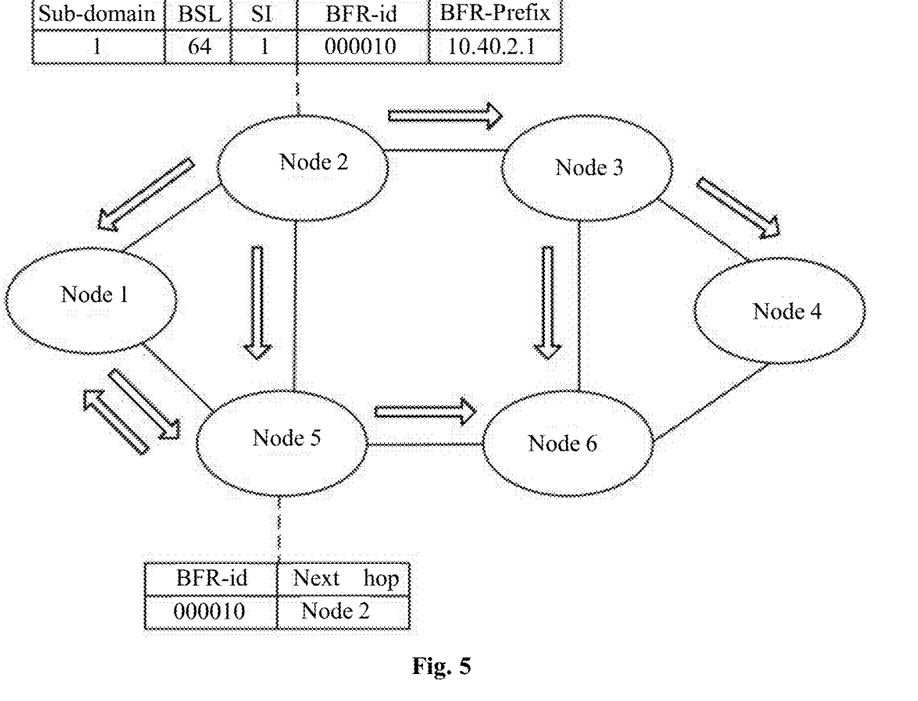
FIG. 5 is a second schematic diagram of notification of BIER related information according to an embodiment of the present disclosure.

Because the Babel is a distance-vector routing protocol, after the BIER related information sent from another node is received, it is needed to send the BIER related information to other nodes, so as to ensure that all the nodes may receive the BIER information of other nodes. As shown in FIG. 5, the information in FIG. 5 is the BIER related information of the node 2, in which the value of the Sub-domain id is 1, the BSL is 64, the SI is 1, the value of the BFR-id is 2, and the value of the BFR-Prefix is 10.40.2.1. After being sent by one BIER node to its adjacent nodes 1/3/5, the information is also forwarded by the nodes 1/3/5. By virtue of this manner, all the nodes will receive the BIER information of all the other nodes except itself.

According to an exemplary embodiment, the node sends its own BIER information to other nodes in a manner of sending the information to all the adjacent nodes. For example, in FIG. 3, the node 2 sends its own BIER information to the nodes 1/3/5. Upon receiving the information of the node 2, the nodes 1/3/5 may send the information to the other adjacent nodes, specifically, the information may be sent simply to all other interfaces except the interface receiving the information, or according to a Babel route calculation result, the information may be sent to other interfaces except an interface having a shortest path to the node 2.

After collecting the BIER information of the other nodes, each of the nodes acquires the BIER forwarding entry according to the route calculation result of the Babel protocol, and when receiving a BIER message, forwards the message according to the BIER forwarding entry, thereby implementing application of the BIER technology.

Figure 6:
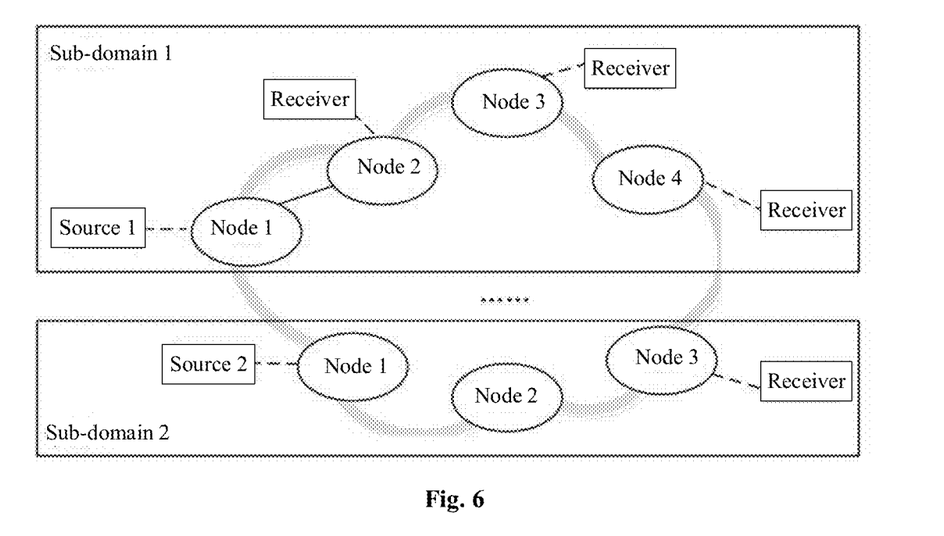
FIG. 6 is a second schematic diagram of the Babel protocol based network according to an embodiment of the present disclosure.

FIG. 6 is a second schematic diagram of the Babel protocol based network according to an embodiment of the present disclosure. As shown in FIG. 6, the network uses the Babel protocol as the routing protocol. BIER management of the network adopts a manner of dividing the sub-domains. As shown in FIG. 6, there are nodes 1/2/3/4 in the sub-domain 1; and there are nodes 1/2/3 in the sub-domain 2. The BFR-ids used in the two sub-domains are repeated, so it is possible to notify in a manner of dividing the sub-domains. The notification manner may be a manner shown in FIG. 4 and FIG. 7, and the information may be notified in a manner of sub-domain for which a type value is assumed as 2. The information may also be notified in a manner for which the type value is assumed as 3, as shown in FIG. 8.

Figure 7:
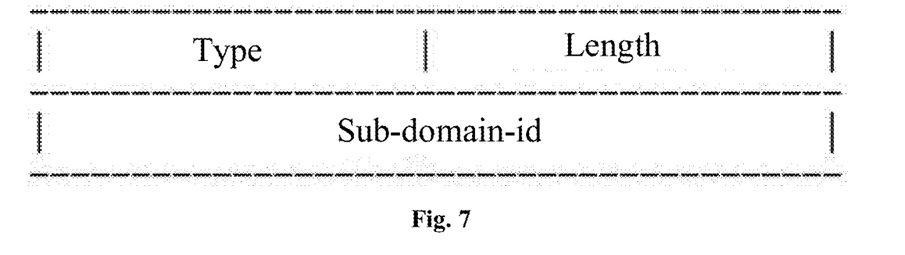
FIG. 7 is a third schematic diagram of notification of BIER related information according to an embodiment of the present disclosure.
Figure 8:
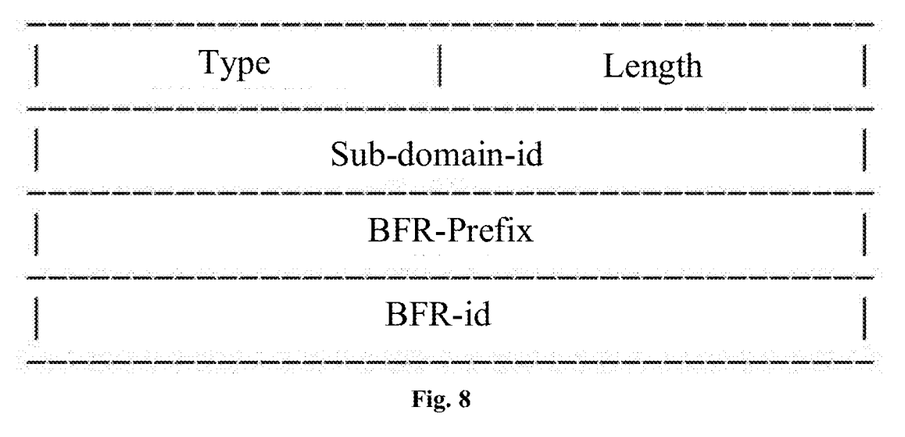
FIG. 8 is a fourth schematic diagram of notification of BIER related information according to an embodiment of the present disclosure.

In the same sub-domain network, for the need of services, the nodes may also be divided in a manner of layering the SI, similarly, the information of the SI may also be notified in a manner for which an individual type value is assumed as 4, as shown in FIG. 7. The information may also be notified together with the other BIER information like the BFR-Prefix and the BFR-id in a manner for which the type value is assumed as 5, as shown in FIG. 8.

Figure 9:
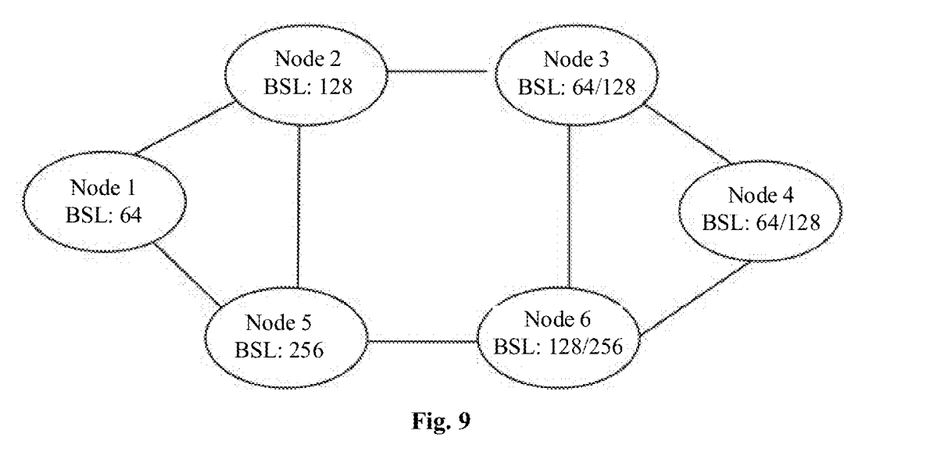
FIG. 9 is a third schematic diagram of the Babel protocol based network according to an embodiment of the present disclosure.
Figure 10:
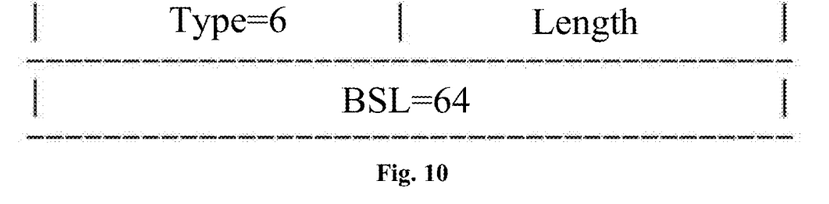
FIG. 10 is a fifth schematic diagram of notification of BIER related information according to an embodiment of the present disclosure.
Figure 11:
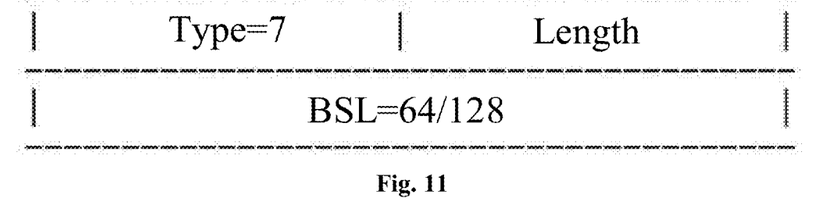
FIG. 11 is a sixth schematic diagram of notification of BIER related information according to an embodiment of the present disclosure.

FIG. 9 is a third schematic diagram of the Babel protocol based network according to an embodiment of the present disclosure. Because of a forwarding feature of the BIER technology, the BSLs that different nodes in the network may support are different, in the network where the Babel serves as the routing protocol, the information of the BSL may also be notified in the Babel protocol extension manner. As shown in FIG. 10, in the network, the BSL that the node 1 supports is 64; the BSL that the node 2 supports is 128; and the BSL that the node 3 supports is 64 and 128. The node 1 may adopt a manner of BSL value for which the type value is 6, as shown in FIG. 10, to notify the BSL. The node 3 may adopt a manner of BSL value for which the type value is 7, as shown in FIG. 11, to notify the BSL.

Figure 12:
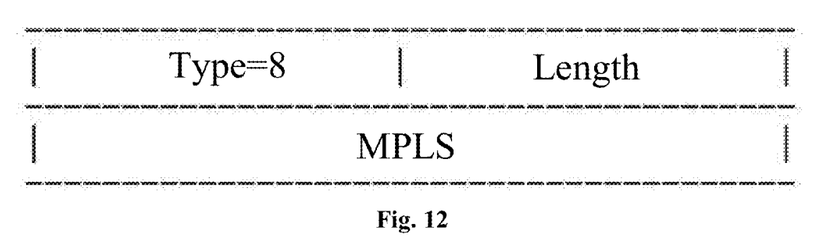
FIG. 12 is a seventh schematic diagram of notification of BIER related information according to an embodiment of the present disclosure.
Figure 13:
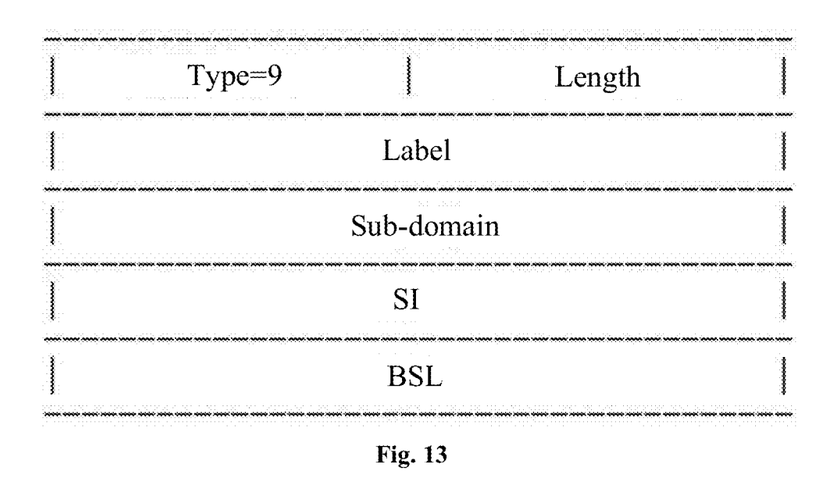
FIG. 13 is an eighth schematic diagram of notification of BIER related information according to an embodiment of the present disclosure.

It is to be noted that in a BIER network, many encapsulation manners may be supported, for example, an Ethernet encapsulation, or an MPLS encapsulation, or other encapsulation manners. Similarly, different encapsulation manners and information may also be notified in the Babel protocol extension manner. For example, the encapsulation manner supported by the node is the MPLS encapsulation may be notified in a manner for which the type value is assumed as 8, as shown in FIG. 12. Furthermore, an MPLS encapsulation label of the node and information represented by the MPLS encapsulation label may also be notified in a manner for which the type value is assumed as 9, as shown in FIG. 13. So, the forwarding entry of an MPLS label table is generated at the node, and during message forwarding, the BIER message may be encapsulated according to the corresponding MPLS label notified by each node.

It is to be noted that if the Babel protocol is used as the routing protocol in a certain BIER network, and the Babel protocol is the distance-vector routing protocol, the BIER related information may be calculated in a common manner of calculating a route (for example, the distance-vector routing algorithm). In some networks, it may be needed to use the SPF algorithm and other algorithms because of service requirements, so the Babel protocol may also be extended to carry an SPF algorithm mark in a manner for which the type value is assumed as 10, as shown in FIG. 12, and each node performs related calculation of the BIER information according to the SPF algorithm.

It is to be noted that there may be nodes not supporting the BIER technology in some BIER networks, when passing these nodes, a tunnel encapsulation manner is often adopted. There may be a Generic Routing Encapsulation (GRE), an MPLS tunnel encapsulation, an IP tunnel encapsulation, and other forms of encapsulation. Tunnel encapsulation information of the node is also transferred as the BIER related information, and the contents included may also include, except a tunnel encapsulation type, a tunnel end, security, and other related information.

The Babel protocol may generally be extended to carry information about the tunnel encapsulation type in a manner for which the type value is assumed as 11, as shown in FIG. 12, and may also be extended to carry related information about the tunnel encapsulation in a manner for which the type value is assumed as 13, as shown in FIG. 13.

It can be seen from each above embodiment that the BIER related information may be transferred in the network in the Babel protocol extension manner, and the TLVs in each embodiment may be combined freely for use, thereby widening the scope and scenario of application of the BIER technology, and having a very important promotion effect on the development of the multicast technology and network.

Through the above description of the implementations, those skilled in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the related art can be embodied in the form of software product; the computer software product is stored in a storage medium (for example, a Read-Only Memory (ROM)/Random Access Memory (RAM), a magnetic disk, and a compact disc) and includes a number of instructions to make a computer device (which can be a personal computer, a server or a network device, etc.) perform all or part of the method in each embodiment of the present disclosure.

Second Embodiment

Figure 14:
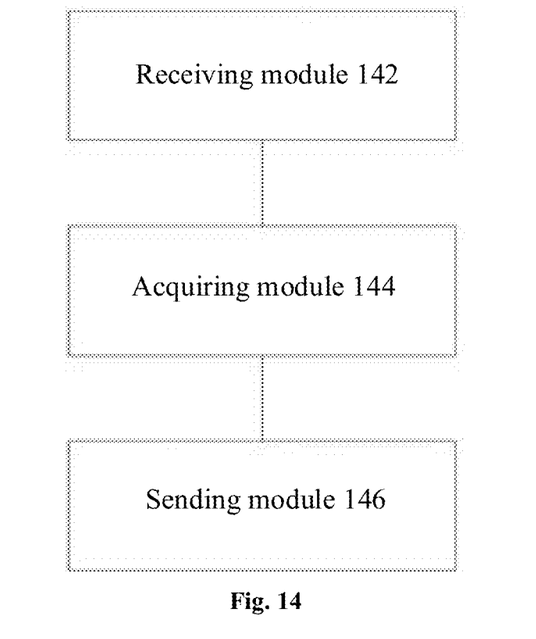
FIG. 14 is a structure diagram of a device for message transmission according to an embodiment of the present disclosure.

The present embodiment also provides a device and node for message transmission. The device is configured to implement the above embodiments and exemplary implementations. The embodiments and exemplary implementations which have been elaborated will not be repeated here. The term "module" used below can realize a combination of software and/or hardware with an intended function. Although the device described in the following embodiment is better realized through software, the realization through hardware or a combination of software and hardware is possible and conceived. FIG. 14 is a structure diagram of the device for message transmission according to an embodiment of the present disclosure. As shown in FIG. 14, the device includes: a receiving module 142, an acquiring module 144, and a sending module 146.

The receiving module 142 is configured to receive BIER information which is sent by other nodes except a first node in a distance-vector routing protocol (Babel) network in a Babel protocol extension manner, herein the BIER information is used for acquiring a BIER forwarding entry.

The acquiring module 144 is coupled to the receiving module 142, and is configured to acquire the BIER forwarding entry according to the BIER information.

The sending module 146 is coupled to the acquiring module 144, and is configured to send the message encapsulated in the BIER manner to said other nodes according to the BIER forwarding entry.

According to an exemplary embodiment, the BIER information includes at least one of BFR-id information of a node and BFR-Prefix information of the node.

According to an exemplary embodiment, the BIER information further includes one or more of: a Sub-domain-id, an SI, a BSL, a Topology id, an encapsulation manner, algorithm information, an MPLS label, and tunnel encapsulation information.

According to an exemplary embodiment, the acquiring module 144 is further configured to acquire the BIER forwarding entry according to the BIER information and either of a default distance-vector routing algorithm and an SPF algorithm.

According to an exemplary embodiment, the sending module is further configured to, after receiving the BIER information which is sent by said other nodes except the first node in the Babel network in the Babel protocol extension manner, send the BIER information and BIER information of the first node to said other nodes except the first node in the Babel network in the Babel protocol extension manner.

According to an exemplary embodiment, the sending module is further configured to send the BIER information to all other interfaces except an interface receiving the BIER information in said other nodes in the Babel protocol extension manner, or according to a Babel route calculation result, send the BIER information to other interfaces except an interface having a shortest path to the first node in said other nodes.

According to an exemplary embodiment, the Babel protocol extension manner may include at least one of a TLV manner and a sub-TLV manner.

According to an exemplary embodiment, the message encapsulated in the BIER manner includes: a message encapsulated by a BIER header, or a message encapsulated in a MPLS+BIER manner.

Figure 15:
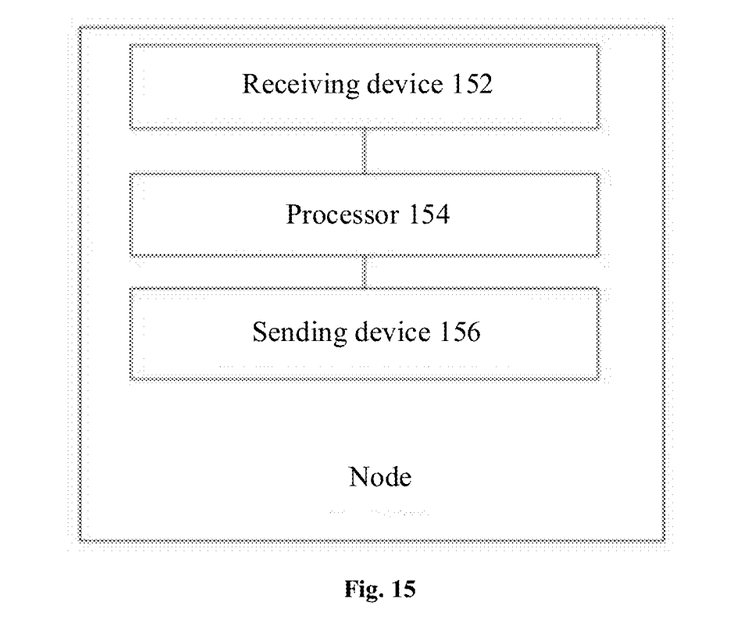
FIG. 15 is a structure diagram of a node according to an embodiment of the present disclosure.

The embodiments of the present disclosure also provide a node. FIG. 15 is a structure diagram of the node according to an embodiment of the present disclosure. As shown in FIG. 15, the node includes: a receiving device 152, a processor 154, and a sending device 156.

The receiving device 152 is configured to receive BIER information which is sent by other nodes except the node in a distance-vector routing protocol (Babel) network in a Babel protocol extension manner, herein the BIER information is used for acquiring a BIER forwarding entry.

The processor 154 is coupled to the receiving device 152, and is configured to acquire the BIER forwarding entry according to the BIER information.

The sending device 156 is coupled to the processor 154, and is configured to send the message encapsulated in the BIER manner to said other nodes according to the BIER forwarding entry.

According to an exemplary embodiment, the BIER information includes at least one of BFR-id information of a node and BFR-Prefix information of the node.

According to an exemplary embodiment, the BIER information further includes one or more of: a Sub-domain-id, an SI, a BSL, a Topology id, an encapsulation manner, algorithm information, an MPLS label, and tunnel encapsulation information.

According to an exemplary embodiment, the processor 154 is further configured to acquire the BIER forwarding entry according to the BIER information and either of a default distance-vector routing algorithm and an SPF algorithm.

According to an exemplary embodiment, the sending device 156 is further configured to send the BIER information and BIER information of the node to said other nodes except the node in the Babel network in the Babel protocol extension manner.

According to an exemplary embodiment, the sending device 156 is further configured to send the BIER information to all other interfaces except an interface receiving the BIER information in said other nodes in the Babel protocol extension manner, or according to a Babel route calculation result, send the BIER information to other interfaces except an interface having a shortest path to the node in said other nodes.

According to an exemplary embodiment, the Babel protocol extension manner may include at least one of a TLV manner and a sub-TLV manner.

According to an exemplary embodiment, the message encapsulated in the BIER manner includes: a message encapsulated by a BIER header, or a message encapsulated in a MPLS+BIER manner.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Third Embodiment

The embodiments of the present disclosure also provide a storage medium. In an exemplary embodiment, in the present embodiment, the storage medium may be set to store program codes for performing the following operations.

At S1, BIER information which is sent, in a Babel protocol extension manner, by other nodes except a first node in a distance-vector routing protocol (Babel) network is received, herein the BIER information is used for acquiring a BIER forwarding entry.

At S2, the BIER forwarding entry is acquired according to the BIER information.

At S3, the message encapsulated in the BIER manner is sent to said other nodes according to the BIER forwarding entry.

According to an exemplary embodiment, the storage medium is also configured to store program codes for performing the following operation.

At S1, the BIER information includes at least one of BFR-id information of a node and BFR-Prefix information of the node.

According to an exemplary embodiment, the storage medium is also configured to store program codes for performing the following operation.

At S1, the BIER information may further include one or more of: a Sub-domain-id, an SI, a BSL, a Topology id, an encapsulation manner, algorithm information, an MPLS label, and tunnel encapsulation information.

According to an exemplary embodiment, the storage medium is also configured to store program codes for performing the following operation: the BIER forwarding entry is acquired according to the BIER information may further include the following operation.

At S1, the BIER forwarding entry is acquired according to the BIER information and either of a default distance-vector routing algorithm and an SPF algorithm.

According to an exemplary embodiment, the storage medium is also configured to store program codes for performing the following operation: after the BIER information which is sent by said other nodes except the first node in the Babel network in the Babel protocol extension manner is received, the method further includes the following operation.

At S1, the BIER information and BIER information of the first node are sent to said other nodes except the first node in the Babel network in a Babel protocol extension manner.

According to an exemplary embodiment, the storage medium is also configured to store program codes for performing the following operation: the BIER information is sent to said other nodes except the first node in the Babel network in the Babel protocol extension manner may further include one of the following operations.

At S1, the BIER information is sent to all other interfaces except an interface receiving the BIER information in said other nodes in a Babel protocol extension manner.

At S2, according to a Babel route calculation result, the BIER information is sent to other interfaces except the interface having the shortest path to the first node in the other nodes.

According to an exemplary embodiment, the storage medium is also configured to store program codes for performing the following operation.

At S1, the Babel protocol extension manner may include at least one of a TLV manner and a sub-TLV manner.

According to an exemplary embodiment, the storage medium is also configured to store program codes for performing the following operation.

At S1, the message encapsulated in the BIER manner includes: a message encapsulated by a BIER header, or a message encapsulated in a MPLS+BIER manner.

According to an exemplary embodiment, the storage medium may include, but not limited to, a USB flash disk, an ROM, an RAM, a mobile hard disk, a magnetic disk or a compact disc, and other media capable of storing the program codes.

According to an exemplary embodiment, the processor performs, according to the program codes stored in the storage medium, the following operations: BIER information which is sent, in a manner of Babel protocol extension, by other nodes except a first node in a distance-vector routing protocol (Babel) network is received, herein the BIER information is used for acquiring a BIER forwarding entry; the BIER forwarding entry is acquired according to the BIER information; and the message encapsulated in the BIER manner is sent to said other nodes according to the BIER forwarding entry.

According to an exemplary embodiment, the processor performs, according to the program codes stored in the storage medium, that: the BIER information includes at least one of BFR-id information of a node and BFR-Prefix information of the node.

According to an exemplary embodiment, the processor performs, according to the program codes stored in the storage medium, that: the BIER information further includes one or more of: a Sub-domain-id, an SI, a BSL, a Topology-id, an encapsulation manner, algorithm information, an MPLS label, and tunnel encapsulation information.

According to an exemplary embodiment, the processor performs, according to the program codes stored in the storage medium, that: the BIER forwarding entry is acquired according to the BIER information may further include: the BIER forwarding entry is acquired according to the BIER information and either of a default distance-vector routing algorithm and an SPF algorithm.

According to an exemplary embodiment, the processor performs, according to the program codes stored in the storage medium, that: after the BIER information which is sent by said other nodes except the first node in the Babel network in the Babel protocol extension manner is received, the method further includes: the BIER information and BIER information of the first node are sent to said other nodes except the first node in the Babel network in the Babel protocol extension manner.

According to an exemplary embodiment, the processor performs, according to the program codes stored in the storage medium, that: the BIER information is sent to said other nodes except the first node in the Babel network in the Babel protocol extension manner may further include: the BIER information is sent to all other interfaces except an interface receiving the BIER information in said other nodes in the Babel protocol extension manner, or according to a Babel route calculation result, the BIER information is sent to other interfaces except an interface having a shortest path to the first node in said other nodes.

According to an exemplary embodiment, the processor performs, according to the program codes stored in the storage medium, that: the Babel protocol extension manner may include at least one of the TLV triple manner and the sub-TLV manner.

According to an exemplary embodiment, the message encapsulated in the BIER manner includes: a message encapsulated by a BIER header, or a message encapsulated in a MPLS+BIER manner.

The specific examples in the present embodiment may refer to the examples described in the above embodiments and alternative embodiments, and will not be repeated here.

It is apparent that those skilled in the art should appreciate that the above modules and operations of the present disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described operations may be executed in an order different from that described here; or they are made into integrated circuit modules, respectively; or multiple modules and operations of them are made into a single integrated circuit module to realize. Therefore, the present disclosure is not limited to any particular combination of hardware and software.

The above is only the exemplary embodiments of the present disclosure and not intended to limit the present disclosure; for those skilled in the art, the present disclosure may have various modifications and changes. Any modifications, equivalent replacements, improvements and the like within the principle of the present disclosure should fall within the protection scope of the claims of the present disclosure.

INDUSTRIAL APPLICABILITY

The technical solution provided by the embodiments of the present disclosure may be applied to the communication field. By using the technical solution provided by the embodiments of the present disclosure may solve the problem in the related art that relevant information about the BIER technology cannot be transmitted in the network running the Babel routing protocol, thereby having a very important promotion effect on the development of the multicast technology and network.

What is claimed is:

1. A method for message transmission, comprising:
receiving Bit Indexed Explicit Replication (BIER) information which is sent by other nodes except a first node in a distance-vector routing protocol (Babel) network in a Babel protocol extension manner, wherein the BIER information is used for acquiring a BIER forwarding entry and comprises at least one of Bit Forwarding Router Identifier (BFR-id) information of a node and BFR-Prefix information of the node, the BIER information further comprises algorithm information, and the Babel protocol extension manner comprises at least one of a Type Length Value (TLV) manner and a sub-TLV manner;
acquiring the BIER forwarding entry according to the BIER information, wherein acquiring the BIER forwarding entry according to the BIER information comprises: acquiring the BIER forwarding entry according to the BIER information and either of a default distance-vector routing algorithm and a Shortest Path First (SPF) algorithm; and
sending a message encapsulated in a BIER manner to said other nodes according to the BIER forwarding entry.

2. The method as claimed in claim 1, wherein the BIER information further comprises one or more of: a Sub-domain Identifier (Sub-domain-id), a Set Identifier (SI), a Bit String Length (BSL), a Topology Identifier (Topology-id), an encapsulation manner, algorithm information, a Multiprotocol Label Switching (MPLS) label, and tunnel encapsulation information.

3. The method as claimed in claim 1, wherein after receiving the BIER information which is sent by said other nodes except the first node in the Babel network in the Babel protocol extension manner, further comprising:
sending the BIER information and BIER information of the first node to said other nodes except the first node in the Babel network in the Babel protocol extension manner.

4. The method as claimed in claim 3, wherein sending the BIER information to said other nodes except the first node in the Babel network in the Babel protocol extension manner comprises:
sending the BIER information to all other interfaces except an interface receiving the BIER information in said other nodes in the Babel protocol extension manner; or,
according to a Babel route calculation result, sending the BIER information to other interfaces except an interface having a shortest path to the first node in said other nodes.

5. The method as claimed in claim 1, wherein the message encapsulated in the BIER manner comprises: a message encapsulated by a BIER header, or a message encapsulated in an MPLS+BIER manner.

6. A device for message transmission, comprising a processor configured to execute the following program modules stored in a memory:
a receiving module, which is configured to receive Bit Indexed Explicit Replication (BIER) information which is sent by other nodes except a first node in a distance-vector routing protocol (Babel) network in a Babel protocol extension manner, wherein the BIER information is used for acquiring a BIER forwarding entry and comprises at least one of Bit Forwarding Router Identifier (BFR-id) information of a node and BFR-Prefix information of the node, the BIER information further comprises algorithm information, and the Babel protocol extension manner comprises at least one of a Type Length Value (TLV) manner and a sub-TLV manner;
an acquiring module, which is configured to acquire the BIER forwarding entry according to the BIER information, wherein the acquiring module is configured to acquire the BIER forwarding entry according to the BIER information and either of a default distance-vector routing algorithm and a Shortest Path First (SPF) algorithm; and
a sending module, which is configured to send a message encapsulated in a BIER manner to said other nodes according to the BIER forwarding entry.

7. The device as claimed in claim 6, wherein the BIER information further comprises one or more of: a Sub-domain Identifier (Sub-domain-id), a Set Identifier (SI), a Bit String Length (BSL), a Topology Identifier (Topology-id), an encapsulation manner, algorithm information, a Multiprotocol Label Switching (MPLS) label, and tunnel encapsulation information.

8. A node, comprising:
a receiving device, which is configured to receive Bit Indexed Explicit Replication (BIER) information which is sent by other nodes except the node in a distance-vector routing protocol (Babel) network in a Babel protocol extension manner, wherein the BIER information is used for acquiring a BIER forwarding entry and comprises at least one of Bit Forwarding Router Identifier (BFR-id) information of a node and BFR-Prefix information of the node, the BIER information further comprises algorithm information, and the Babel protocol extension manner comprises at least one of a Type Length Value (TLV) manner and a sub-TLV manner;
a processor, which is configured to acquire the BIER forwarding entry according to the BIER information, wherein the processor is further configured to acquire the BIER forwarding entry according to the BIER information and either of a default distance-vector routing algorithm and a Shortest Path First (SPF) algorithm; and a sending device, which is configured to send a message encapsulated in a BIER manner to said other nodes according to the BIER forwarding entry.

9. The node as claimed in claim 8, wherein the BIER information further comprises one or more of: a Sub-domain Identifier (Sub-domain-id), a Set Identifier (SI), a Bit String Length (BSL), a Topology Identifier (Topology-id), an encapsulation manner, algorithm information, a Multiprotocol Label Switching (MPLS) label, and tunnel encapsulation information.

10. The node as claimed in claim 8, wherein the sending device is further configured to send the BIER information and BIER information of the node to said other nodes except the node in the Babel network in the Babel protocol extension manner.

11. The node as claimed in claim 10, wherein the sending device is further configured to send the BIER information to all other interfaces except an interface receiving the BIER information in said other nodes in the Babel protocol extension manner, or according to a Babel route calculation result, send the BIER information to other interfaces except an interface having a shortest path to the node in said other nodes.

12. The node as claimed in claim 8, wherein the message encapsulated in the BIER manner comprises: a message encapsulated by a BIER header, or a message encapsulated in an MPLS+BIER manner.

13. A non-transitory computer storage medium, in which one or more computer-executable programs are stored; when executed by the computer, the one or more computer-executable programs enable the computer to perform the message transmission method as claimed in claim 1.

* * * * *